US010233979B2

(12) United States Patent
Schneider (10) Patent No.: US 10,233,979 B2
(45) Date of Patent: Mar. 19, 2019

(54) CLUTCH DISC FOR A DISENGAGING TORQUE TRANSMISSION DEVICE

(71) Applicant: MAN Truck & Bus AG, München (DE)

(72) Inventor: Bernhard Schneider, Erdweg (DE)

(73) Assignee: MAN TRUCK & BUS AG, München (DE)

( * ) Notice: Subject to any disclaimer, the term of this patent is extended or adjusted under 35 U.S.C. 154(b) by 18 days.

(21) Appl. No.: 15/344,188

(22) Filed: Nov. 4, 2016

(65) Prior Publication Data

US 2017/0130782 A1    May 11, 2017

(30) Foreign Application Priority Data

Nov. 6, 2015  (DE) .................. 10 2015 014 396

(51) Int. Cl.
  *F16D 13/64* (2006.01)
  *F16F 1/00* (2006.01)

(52) U.S. Cl.
  CPC .......... *F16D 13/64* (2013.01); *F16D 2300/22* (2013.01); *F16F 1/00* (2013.01)

(58) Field of Classification Search
  CPC ..................................................... F16D 13/64
  See application file for complete search history.

(56) References Cited

U.S. PATENT DOCUMENTS

| 1,964,566 | A |   | 6/1934  | Fawick |
| 2,905,279 | A |   | 9/1959  | Moyer |
| 2,916,123 | A |   | 12/1959 | Garmager |
| 3,403,758 | A |   | 10/1968 | Stout |
| 3,921,777 | A | * | 11/1975 | Rist .......... F16D 13/64 192/107 C |
| 4,821,860 | A | * | 4/1989  | Crawford ................ F16D 13/64 188/218 XL |
| 4,869,356 | A | * | 9/1989  | Cameron ................ F16D 13/64 192/107 C |
| 5,085,307 | A | * | 2/1992  | Scheer .................... F16D 13/64 192/107 C |
| 5,097,932 | A |   | 3/1992  | Flotow |
| 5,850,895 | A |   | 12/1998 | Evrard |
| 6,039,163 | A |   | 3/2000  | Bassett |

(Continued)

FOREIGN PATENT DOCUMENTS

| DE | 19980204 B4    | 1/2011 |
| DE | 102015122935 A1 | 7/2016 |
| EP | 1933053 A1     | 6/2008 |

(Continued)

OTHER PUBLICATIONS

Swedish Patent and Registration Office, MAN Novelty Search Report, dated Mar. 29, 2016, 8 pages.

*Primary Examiner* — Timothy Hannon
(74) *Attorney, Agent, or Firm* — Lucas & Mercanti, LLP (57) ABSTRACT

A clutch disc for a disengaging torque transmission device includes a carrier plate on which a friction lining is provided for non-positive closure of the torque transmission device. At least one vibration-influencing area is formed on the carrier plate for influencing the vibration behaviour of the clutch disc, in particular for damping at least one defined clutch disc vibration, the vibration-influencing area being formed by an opening and/or by an impression on the carrier plate.

13 Claims, 5 Drawing Sheets

(56) References Cited

U.S. PATENT DOCUMENTS

2010/0116603 A1  5/2010  Kitchell

FOREIGN PATENT DOCUMENTS

| EP | 2157329 A2 | 2/2010 |
| FR | 2764019 A1 | 12/1998 |
| WO | 2013079875 A1 | 6/2013 |
| WO | 2016000705 A1 | 1/2016 |

* cited by examiner

CLUTCH DISC FOR A DISENGAGING TORQUE TRANSMISSION DEVICE

CROSS-REFERENCE TO RELATED APPLICATIONS

The present application claims priority of DE 10 2015 014 396.4, filed Nov. 6, 2015, which is incorporated herein by reference.

BACKGROUND OF THE INVENTION

The invention relates to a clutch disc for a disengaging torque transmission device, a disengaging torque transmission device having the clutch disc and a vehicle, in particular a commercial vehicle, having the disengaging torque transmission device.

A disengaging torque transmission device or a releasable clutch, which serves for connecting a drive unit of the vehicle, for example an internal combustion engine or an electrical machine, to a transmission of the vehicle for the transmission of torque, is routinely provided on a vehicle. Here the releasable clutch comprises a shifting clutch disc connected to a transmission input shaft for the transmission of torque, which is pressed against a flywheel of the internal combustion engine, for example, in order to close the clutch. In this way a non-positive or frictional connection is established between the internal combustion engine and the transmission. The clutch disc usually comprises a carrier plate, which is provided with a friction lining at least on a side facing the internal combustion engine flywheel.

During closing of the clutch, in particular, and also in the closed state of the clutch, the carrier plate of the clutch disc is prone to vibrate, often heavily. These vibrations are generated, for example, by the torque-transmitting connection of the transmission input shaft to the clutch disc. Furthermore, the carrier plate may also be led to vibrate by the frictional heat input into the carrier plate. The heat input into the carrier plate may cause such a deformation or expansion of the carrier plate that the carrier plate buckles. As a result of this buckling of the carrier plate, the clutch disc comes to bear only on areas of the internal combustion engine flywheel, so that it likewise begins to vibrate, owing to the relative movement between the clutch disc and the internal combustion engine flywheel. The vibrations of the carrier plate often cause distinctly audible noises, particularly in natural frequency ranges of the carrier plate. The vibrations of the carrier plate moreover have a negative effect on the durability of the clutch disc, especially on the durability of the friction lining of the clutch disc.

BRIEF SUMMARY OF THE INVENTION

An object of the invention, therefore, is to provide a clutch disc for a disengaging torque transmission device, which has an improved vibration behaviour.

In one embodiment, a clutch disc for a disengaging torque transmission device includes a carrier plate, on which a friction lining is provided for non-positive closure of the torque transmission device. According to this embodiment at least one vibration-influencing area is formed on the carrier plate for influencing the vibration behaviour of the clutch disc, in particular for damping at least one defined clutch disc vibration, the vibration-influencing area being formed by an opening and/or by an impression or depression on the carrier plate.

Vibration behaviour of the clutch disc is significantly improved because at least the one opening and/or at least the one impression specifically interrupt or damp vibrations of the carrier plate, so that the vibrations cannot spread to the usual degree. Furthermore, at least the one opening and/or at least the one impression also serve specifically to counteract a thermally induced buckling of the carrier plate and therefore a thermally induced generation of vibrations in the carrier plate.

Here the shape and position of at least the one vibration-influencing area and the number of vibration-influencing areas may depend, for example, on the type of vibration to be influenced, the frequency of the vibration to be influenced, the thickness of the carrier plate, the carrier plate material or the direction of rotation of the carrier plate.

The term "impression" is here expressly to be interpreted in a wide sense. Thus the impression may be formed, for example, by impressing or deforming just one main face wall of the carrier plate. The impression may equally well be formed by pressing the carrier plate through, so that both main face walls of the carrier plate are deformed.

In a preferred embodiment of the clutch disc at least the one opening extends continuously or right through the carrier plate in the carrier plate thickness direction. This is an especially effective way of interrupting or damping the vibrations of the carrier plate. The through-opening here can be produced, for example, by a laser, by a milling cutter, a stamping machine or by erosion. Alternatively, however, at least the one opening may also naturally not extend right through the carrier plate, so that the opening extends through the carrier plate to a depth which is less than the thickness of the carrier plate.

In a top view of the carrier plate, at least the one vibration-influencing area preferably runs linearly, i.e., along a line, in particular in a curved path, in order to allow effective influencing of the vibrations of the carrier plate and at the same time to afford the carrier plate a high degree of strength. It is preferred here that a first end area of the linear vibration-influencing area be arranged radially inside a second end area of the vibration-influencing area, in order to effectively counteract a thermally induced buckling of the carrier plate. It is furthermore preferable for at least an end area of the vibration-influencing area to be arranged after an area of the vibration-influencing area immediately adjoining the end area, viewed in the direction of rotation of the clutch disc.

In a preferred development at least the one vibration-influencing area runs rectilinearly instead of along a curved path. Here at least the one rectilinear vibration-influencing area preferably runs in the clutch disc radial direction, in order to counteract a thermally induced buckling of the carrier plate. It is furthermore preferred that at least the one rectilinear vibration-influencing area be separated by a defined interval from a radially inner wall of the carrier plate. It is equally preferable for at least the one rectilinear vibration-influencing area to be separated by a defined interval from a radially outer wall of the carrier plate.

As an alternative to the rectilinear course of the vibration-influencing area, at least the one linear vibration-influencing area may also be of a meandering form. It is preferable here for at least the one meandering vibration-influencing area to be of a substantially sinusoidal form with an amplitude diminishing inwards in the clutch disc radial direction. Such a development of the vibration-influencing area likewise serves effectively to counteract a thermally induced buckling of the carrier plate.

It is furthermore preferred that at least the one meandering vibration-influencing area be separated by a defined interval from a radially inner wall of the carrier plate. It is equally preferable for at least the one meandering vibration-influencing area to be separated by a defined interval from a radially outer wall of the carrier plate.

As a further alternative to the rectilinear course of the vibration-influencing area at least the one linear vibration-influencing area may also be of a substantially hook-shaped form. It is preferred here that at least the one hook-shaped vibration-influencing area open with an end area into a radially outer wall of the carrier plate.

The hook-shaped vibration-influencing area proceeding from the radially outer wall of the carrier plate furthermore preferably comprises a substantially S-shaped portion, adjoining which is a substantially C-shaped portion of the hook-shaped vibration-influencing area. It is especially preferred if the hook-shaped vibration-influencing area here is formed according to the embodiment of the hook-shaped vibration-influencing area shown in FIG. 6. Alternatively and/or in addition, the hook-shaped vibration-influencing area, also proceeding from the radially outer wall of the carrier plate, may also be of a substantially L-shaped or a substantially U-shaped form with a shortened U-leg.

In a preferred embodiment the impression, viewed in cross section transversely to the course of the vibration-influencing area, is of meandering and/or undulating form, in order to be able to interrupt or damp the vibrations of the carrier plate in an especially effective manner.

In order to reduce the notch effect of the linear vibration-influencing area, at least an end area of the vibration-influencing area, in a top view of the carrier plate, is expanded and/or wider or laterally extended compared to an adjoining area of main extent of the vibration-influencing area. This is an effective way of counteracting high notch stresses on the end area of the vibration-influencing area.

Alternatively and/or in addition, in order to reduce the notch effect of the vibration-influencing area at least an end area of the vibration-influencing area may have a round, in particular drop-shaped and/or a circular and/or a spherical external contour.

In an embodiment of the invention, the clutch friction lining is formed by at least one friction plate fixed to the carrier plate, the friction plate being assigned to a main face wall of the carrier plate, at least the one impression of the carrier plate protruding from this main face wall in the carrier plate thickness direction, and the friction plate having at least one opening, into which at least the one impression protruding from the main face wall of the carrier plate extends. This affords an especially simple clutch disc construction. Here the friction plate may be riveted or screwed to the carrier plate, or adhesively bonded onto the carrier plate. If a substantially laminar spring element is arranged between the carrier plate and the friction plate, at least one opening is likewise preferably provided on the spring element, through which at least the one protruding impression extends.

At least the one opening preferably extends continuously or right through the friction plate in the friction plate thickness direction, as an especially effective way of interrupting or damping the vibrations of the carrier plate. Alternatively, however, at least the one opening may extend through the friction plate only to a depth which is less than the thickness of the friction plate.

In a further preferred embodiment multiple vibration-influencing areas are formed on the carrier plate. In this case the multiple vibration-influencing areas are preferably arranged at an interval from one another and/or uniformly distributed over the carrier plate, viewed in a clutch disc circumferential direction, as an effective way of influencing the vibrations of the carrier plate.

At least a number of the multiple vibration-influencing areas, in a top view of the carrier plate, have a different course from at least another number of the multiple vibration-influencing areas. Here multiple, in particular three, groups are preferably provided, each having multiple, in particular four, vibration-influencing areas, the vibration-influencing areas of the respective group having an identical linear course and the groups being distinguished from one another by the course of the vibration-influencing areas.

In a preferred embodiment, the clutch friction lining is formed by multiple, in particular two, friction plates fixed to the carrier plate, at least one friction plate being assigned to a first main face wall of the carrier plate, and at least one friction plate being assigned to a second main face wall of the carrier plate. Here a disc-shaped friction plate, for example, may be assigned to the respective main face wall of the carrier plate. Alternatively, multiple thinner or thicker sector-shaped friction plates, which are distributed in the clutch disc circumferential direction, may also be assigned to the respective main face wall of the carrier plate.

At least one substantially disc-shaped spring element, which serves to cushion axial forces acting on the clutch disc, is furthermore preferably arranged between at least one main face wall of the carrier plate and the assigned friction plate.

In addition, a disengaging torque transmission device or a releasable clutch comprising the clutch disc according to the invention is also claimed. The advantages accruing from this are identical to the advantages of the clutch disc according to the invention already assessed, so these will not be repeated at this juncture.

Furthermore, a vehicle, in particular a commercial vehicle, having the disengaging torque transmission device according to the invention is also claimed. The advantages accruing from this are likewise identical to the advantages of the clutch disc according to the invention already assessed, so these will likewise not be repeated at this juncture.

In a preferred development of the vehicle the clutch disc is at the same time connected to an input shaft of a vehicle transmission for the transmission of torque.

Except in instances of clear dependencies or irreconcilable alternatives, for example, the advantageous embodiments and developments of the invention explained above and/or described in the dependent claims may be used individually or also in any combination with one another.

BRIEF DESCRIPTION OF THE DRAWINGS

The invention and its advantageous embodiments and developments together with their advantages are explained in more detail below merely by way of example, referring to drawings, of which.

DETAILED DESCRIPTION OF THE PREFERRED EMBODIMENTS

Figure 1:
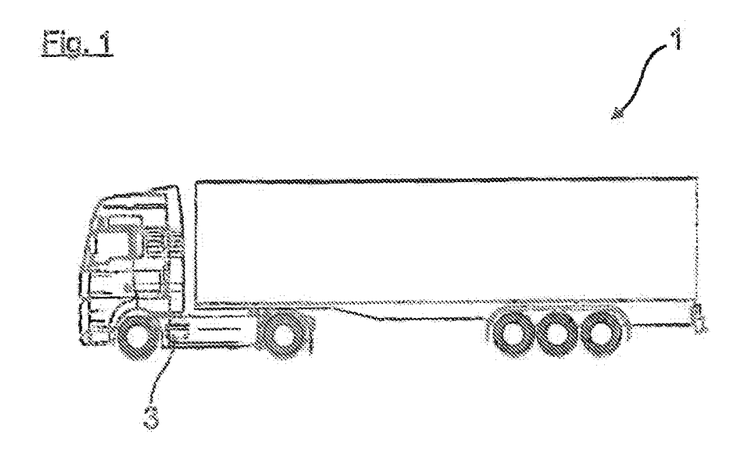
FIG. 1 is a side view of a truck having the disengaging torque transmission device according to the invention.
Figure 2:
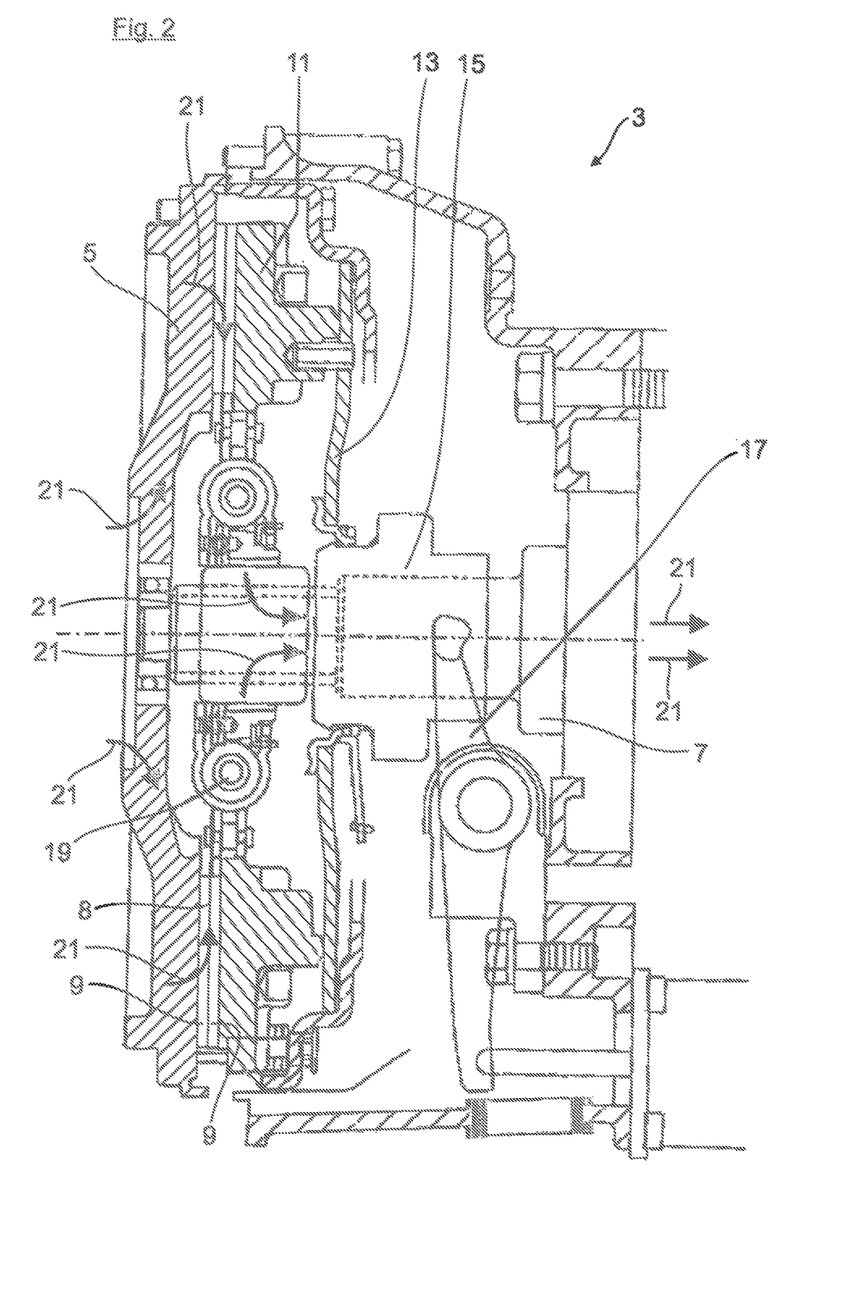
FIG. 2 is a sectional view through the disengaging torque transmission device according to an embodiment of the invention.

FIG. 1 shows a vehicle 1, here embodied as a truck, for example. The vehicle 1 comprises a first embodiment of a disengaging torque transmission device 3 or a releasable clutch, indicated in FIG. 1 by dashed lines, which serves for connecting an internal combustion engine, forming a drive unit of the vehicle 1, to a transmission of the vehicle 1 for the transmission of torque. The construction of the torque transmission device 3 is explained in more detail below with reference to FIG. 2:

According to the section through the torque transmission device 3 shown in FIG. 2, the torque transmission device 3 here, for example, comprises a flywheel 5 on the internal combustion engine side, a clutch disc 8 connected to a transmission input shaft 7 for the transmission of torque, with a friction lining 9, a pressure plate 11, a clutch spring or a diaphragm spring 13, a clutch operator 15 and a clutch release lever 17. Furthermore, the clutch disc 8 here, for example, is connected via a torsional-vibration damper 19 to the transmission input shaft 7. In FIG. 2 the torque transmission device 3 is shown in a closed state, so that the flywheel 5 on the internal combustion engine side and the input shaft 7 on the transmission side are connected to one another via a power flow 21 for the transmission of torque. In addition, the construction shown in FIG. 2 is only one example of the configuration of the torque transmission device 3, which is intended to demonstrate the basic construction and the fundamental working of the torque transmission device 3. The torque transmission device 3 according to the invention, however, is expressly not limited to such a construction. For example, the torsional-vibration damper 19 need not necessarily be provided on the torque transmission device 3.

Figure 3:
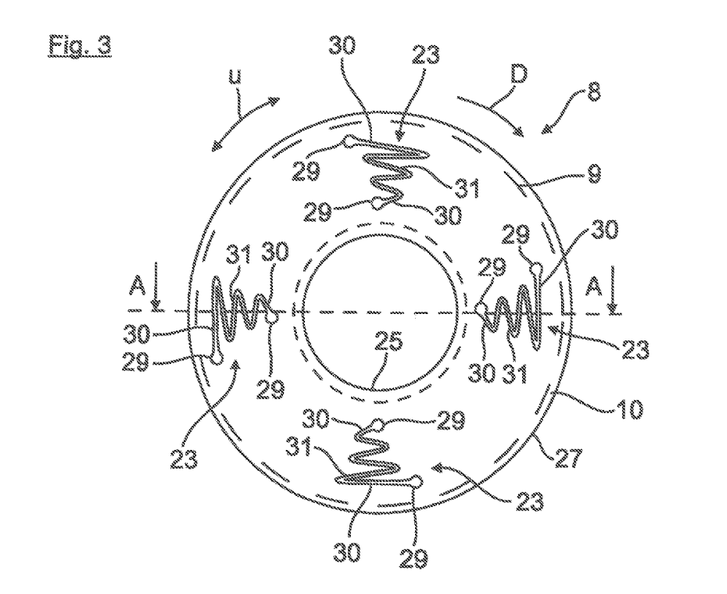
FIG. 3 is a top view of a clutch disc of the transmission device according to an embodiment of the invention.
Figure 4:
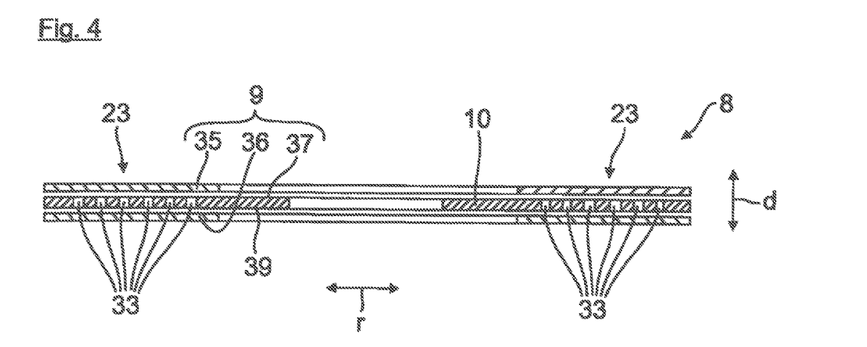
FIG. 4 is a sectional representation along the plane of section A-A in FIG. 3.

FIG. 3 shows a view from above or top view of the clutch disc 8. The friction lining 9 here is indicated by dashed lines, so that the carrier plate 10 of the clutch disc 8 is visible. The carrier plate 10 here, for example, comprises multiple vibration-influencing areas 23, which serve to influence the vibration behaviour of the clutch disc. In concrete terms, the carrier plate 10 here, for example, comprises four substantially linear vibration-influencing areas 23, which have an identical course and are arranged over the carrier plate 10, separated by uniform intervals from one another, here by 90°, for example, and in the clutch disc circumferential direction u. Each linear vibration-influencing area 23 here, for example, is of substantially sinusoidal form with an amplitude diminishing inwards in the clutch disc radial direction r (FIG. 4). Moreover, each vibration-influencing area 23 here, for example, is separated by a defined interval from the radially inner wall 25 of the carrier plate 10. Furthermore, each vibration-influencing area 23 here, for example, is also separated by a defined interval from a radially outer wall 27 of the carrier plate 10.

According to FIG. 3, moreover, end areas 29 of the respective sinusoidal vibration-influencing area 23, in a top view of the carrier plate 10, are here expanded or of wider formation compared an adjoining area of extent 31 of the sinusoidal vibration-influencing area 23. In concrete terms each end area 29 of the respective vibration-influencing area 23 here has a drop-shaped external contour, for example. This reduces the notch effect of the linear vibration-influencing areas 23. In addition, each end area 29 of the linear vibration-influencing areas 23 here is moreover arranged after an area 30 of the respective linear vibration-influencing area 23 immediately adjoining the respective end area 29, viewed in the direction of rotation D of the clutch disc 8.

FIG. 4 shows a section through the clutch disc 8 along the plane of section A-A in FIG. 3. It is apparent from this representation that here each linear vibration-influencing area 23 is formed by an opening 33 provided on the carrier plate 10, which extends continuously or right through the carrier plate 10 in the carrier plate thickness direction or in clutch disc thickness direction d.

In addition, the friction lining 9 of the clutch disc 8 here, for example, is formed by two friction plates 35, 36 fixed to the carrier plate 10. Here the friction plate 35 is in flat contact with a first main face wall 37 of the carrier plate 10. The friction plate 36 is in flat contact with a second main face wall 39 of the carrier plate 10 opposite the first main face wall 37. The friction plates 35, 36 may be fixed to the carrier plate 10 by means of riveted connection, a screwed connection or also by means of an adhesively bonded connection, for example.

Figure 5:
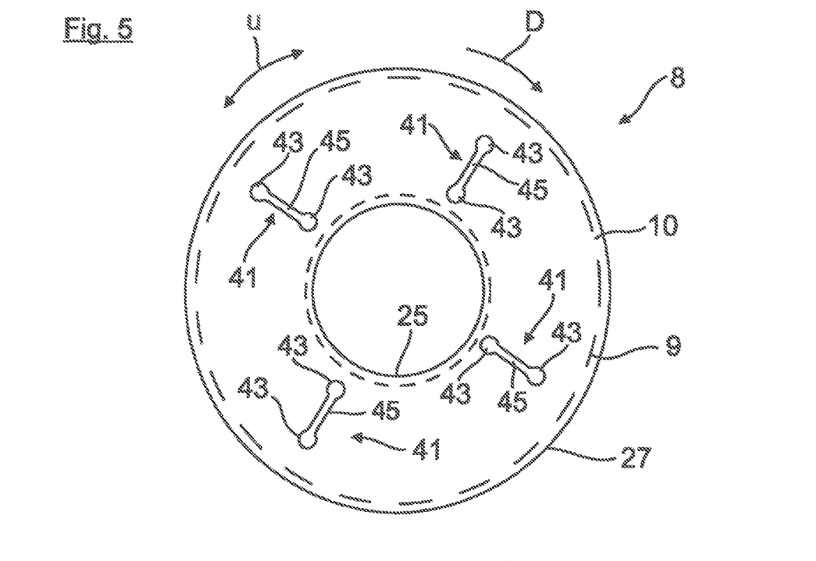
FIG. 5 is a top view of a second embodiment of the clutch disc.

FIG. 5 shows a second embodiment of the clutch disc 8. Compared to the first embodiment of the clutch disc 8 shown in FIG. 3, the carrier plate 10 of the clutch disc 8 here does not have any sinusoidal vibration-influencing areas 23, but vibration-influencing areas 41 running rectilinearly in the clutch disc radial direction r. Each rectilinear vibration-influencing area 41 here, for example, is likewise separated by a defined interval from the radially inner wall 25 and by a defined interval from the radially outer wall 27 of the carrier plate 10. Furthermore, in a top view of the carrier plate 10, end areas 43 of the respective rectilinear vibration-influencing area 41 are here likewise expanded or of wider formation compared to an adjoining area of main extent 45 of the respective vibration-influencing area 41. Furthermore, the end areas 43 of the rectilinear vibration-influencing areas 41 here also have a drop-shaped external contour.

Figure 6:
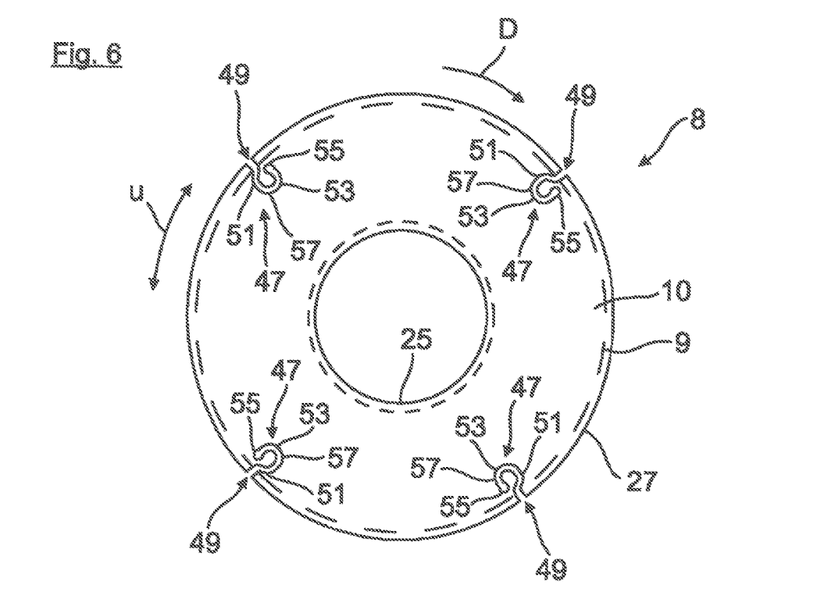
FIG. 6 is a top view of a third embodiment of the clutch disc.

FIG. 6 shows a third embodiment of the clutch disc 8. Compared to the first embodiment of the clutch disc 8 shown in FIG. 3, no sinusoidal vibration-influencing areas 23 are provided here, but instead vibration-influencing areas 47 of a substantially hook-shaped form. An end area 49 of the respective vibration-influencing area 47 here at the same time opens into the radially outer wall 27 of the carrier plate 10, so that the radially outer wall 27 of the carrier plate 10 is interrupted at this point. Proceeding from the radial outer wall 27 of the carrier plate 10, each hook-shaped vibration-influencing area 47 here, for example, comprises a substantially S-shaped portion 51, adjoining which is a substantially C-shaped portion 53 of the respective hook-shaped vibration-influencing area 47. Here, in a top view of the carrier plate 10, an end area 55 of the respective vibration-influencing area 47 is expanded or of wider formation compared to an area of main extent 57 of the respective hook-shaped vibration-influencing area 47, and has a drop-shaped external contour.

Figure 7:
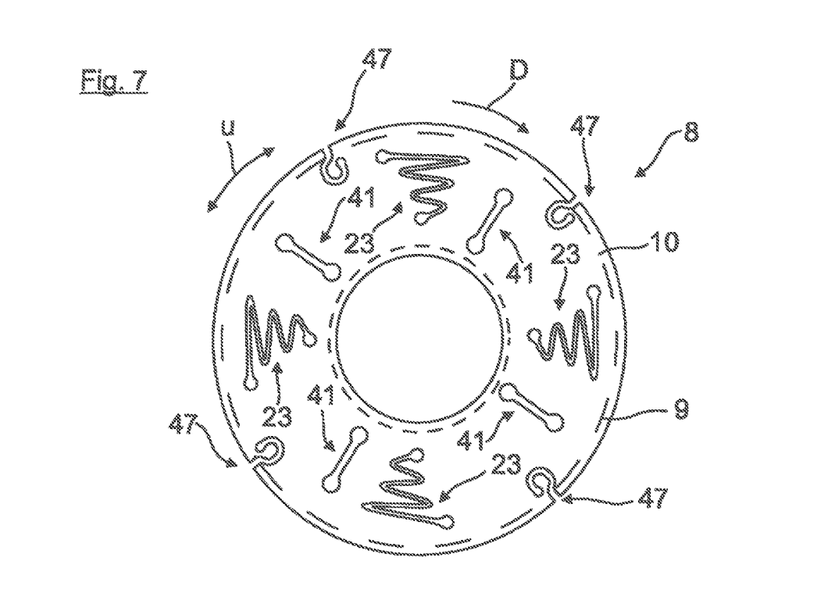
FIG. 7 is a top view of a fourth embodiment of the clutch disc.

FIG. 7 shows a fourth embodiment of the clutch disc 8. Compared to the first embodiment of the clutch disc 8 shown in FIG. 3, the carrier plate here comprises not only the sinusoidal vibration-influencing areas 23, but also the rectilinear vibration-influencing areas 41 and the hook-shaped vibration-influencing areas 47. Consequently, the carrier plate 10 here, for example, comprises three groups each of four linear vibration-influencing areas 23, 41, 47. The four linear vibration-influencing areas 23, 41, 47 in a group here have an identical linear course. The three groups are moreover distinguished from one another by the linear course of their vibration-influencing areas 23, 41, 47. In addition, the vibration-influencing areas 23, 41, 47 here are likewise separated by an interval from one another and, viewed in the clutch disc circumferential direction u, are distributed uniformly over the carrier plate 10.

Figure 8:
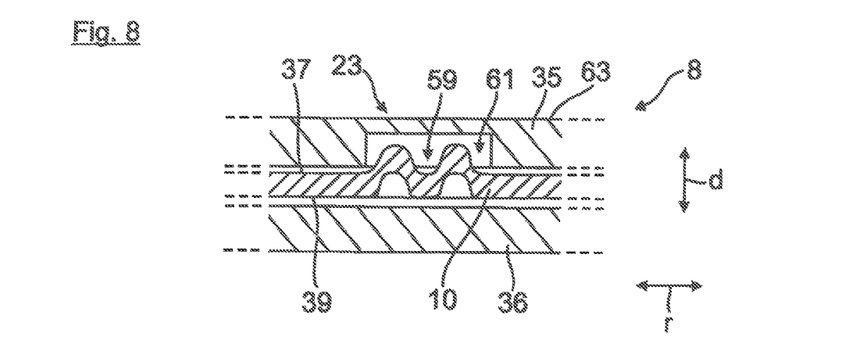
FIG. 8 is a sectional view through a fifth embodiment of the clutch disc.

FIG. 8 shows part of a fifth embodiment of the clutch disc 8. Compared to the first embodiment of the clutch disc 8 shown in FIG. 4, each vibration-influencing area 23 here is not formed by an opening 33, but by an impression 59 on the carrier plate 10 of the clutch disc 8. Viewed in cross section transversely to the linear course of the respective vibration-influencing area 23, each impression 59 here, for example, is of meandering or undulating shape. Moreover, each impression 59 here, for example, projects from the main face wall 37 of the carrier plate 10 in the carrier plate thickness direction or in the clutch disc thickness direction d, in the direction of the friction plate 35 bearing on the main face wall 37. In the area of the respective impression 59, the friction plate 35 bearing on the main face wall 37 here, for example, in each case comprises an opening 61, into which the impression 59 projecting from the main face wall 37 of the carrier plate 10 extends. The opening 61 here, for example, extends through the friction plate 35 bearing on the main face wall 37 to a depth which is less than the friction plate thickness, so that a main face wall 63 of the friction plate 35 remote from the main face wall 37 is not interrupted here.

Figure 9:
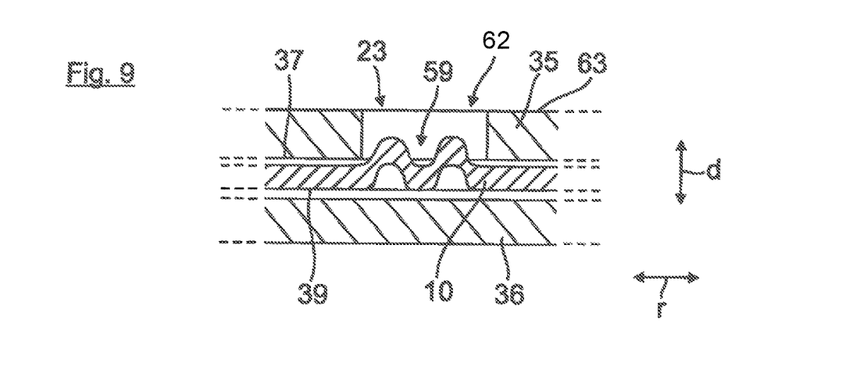
FIG. 9 is a sectional view of a sixth embodiment of the clutch disc.

FIG. 9 shows a sixth embodiment of the clutch disc 8. Compared to the embodiment shown in FIG. 8, the respective opening 62 here extends continuously or right through the friction plate 35 bearing on the main face wall 37 in the clutch disc thickness direction d, so that the main face wall 63 of the friction plate 35 is interrupted here.

LIST OF REFERENCE NUMERALS 1 vehicle
3 torque transmission device
5 flywheel
7 input shaft
8 clutch disc
9 friction lining
10 carrier plate
11 pressure plate
13 diaphragm spring
15 clutch operator
17 clutch release lever
19 torsional-vibration damper
21 power flow
23 vibration-influencing area
25 radially inner wall
27 radially outer wall
29 end area
30 area
31 area of main extent
33 opening
35 friction plate
36 friction plate
37 main face wall
39 main face wall
41 vibration-influencing area
43 end area
45 area of main extent
47 vibration-influencing area
49 end area
51 portion
53 portion
55 end area
57 area of main extent
59 impression
61 opening
62 opening
63 main face wall
d clutch disc thickness direction
D clutch disc direction of rotation
r clutch disc radial direction
u clutch disc circumferential direction

The invention claimed is:

1. A clutch disc for a disengaging torque transmission device, comprising:
   a carrier plate; and
   a friction lining provided on the carrier plate for non-positive closure of the torque transmission device,
   wherein a vibration-influencing area is formed on the carrier plate for influencing the vibration behaviour of the clutch disc and damping at least one defined clutch disc vibration, the vibration-influencing area formed by an impression on the carrier plate, the impression being formed by at least one of impressing and deforming the carrier plate,
   wherein in a top view of the carrier plate the vibration-influencing area runs linearly, and
   wherein viewed in cross section transversely to a linear course of the vibration-influencing area, the impression is of at least one of a meandering form and undulating form.

2. The clutch disc according to claim 1, wherein a first end area of the vibration-influencing area is arranged radially inside a second end area of the vibration-influencing area.

3. The clutch disc according to claim 2, wherein the vibration-influencing area runs rectilinearly in a clutch disc radial direction.

4. The clutch disc according to claim 3, wherein the vibration-influencing area is at least one of separated by a defined interval from a radially inner wall of the carrier plate and separated by a defined interval from a radially outer wall of the carrier plate.

5. The clutch disc according to claim 2, wherein the vibration-influencing area is of the meandering form.

6. The clutch disc according to claim 5, wherein the vibration-influencing area is of a substantially sinusoidal form with an amplitude diminishing inwards in a clutch disc radial direction.

7. The clutch disc according to claim 6, wherein the vibration-influencing area is at least one of separated by a defined interval from a radially inner wall of the carrier plate and separated by a defined interval from a radially outer wall of the carrier plate.

8. The clutch disc according to claim 2, wherein, in order to reduce a notch effect, at least one of the first end area and the second end area of the vibration influencing area, in a top view of the carrier plate, is at least one of expanded and of wider formation compared to an adjoining area of main extent of the vibration influencing area.

9. The clutch disc according to claim 2, wherein, in order to reduce a notch effect, at least one of the first end area and the second end area of the vibration-influencing area has a round, drop-shaped, or circular external contour.

10. The clutch disc according to claim 1, wherein the clutch friction lining is formed by a friction plate fixed to the carrier plate, the friction plate being assigned to a main face wall of the carrier plate, the impression of the carrier plate protruding from at least one main face wall of the carrier plate in a carrier plate thickness direction, and the friction plate having at least one opening, into which the impression protruding from the main face wall of the carrier plate extends.

11. The clutch disc according to claim 10, wherein the at least one opening extends continuously through the friction plate in a friction plate thickness direction.

12. A disengaging torque transmission device having the clutch disc according to claim 1.

13. A commercial vehicle, having the disengaging torque transmission device according to claim 12.

* * * * *